(12) United States Patent
Li (10) Patent No.: US 12,491,790 B2
(45) Date of Patent: Dec. 9, 2025

(54) BATTERY REPLACEMENT VEHICLE WITHOUT INTERMEDIATE TRANSMISSION SHAFT

(71) Applicants: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

(*) Notice: Subject to any disclaimer, the term of this patent is extended or adjusted under 35 U.S.C. 154(b) by 330 days.

(21) Appl. No.: 18/315,737

(22) Filed: May 11, 2023

(65) Prior Publication Data

US 2023/0278457 A1  Sep. 7, 2023

Related U.S. Application Data

(63) Continuation of application No. PCT/CN2020/139057, filed on Dec. 24, 2020.

(30) Foreign Application Priority Data

Dec. 15, 2020 (CN) .......................... 202011471820.0

(51) Int. Cl.
*B60K 1/02* (2006.01)
*B60K 1/04* (2019.01)
*B60L 53/80* (2019.01)

(52) U.S. Cl.
CPC ............ *B60L 53/80* (2019.02); *B60K 1/02* (2013.01); *B60K 1/04* (2013.01); *B60K 2001/0438* (2013.01)

(58) Field of Classification Search
CPC ... B60L 53/80; B60K 1/02; B60K 2001/0438; B60K 1/04
(Continued)

(56) References Cited

U.S. PATENT DOCUMENTS 6,615,946 B2    9/2003   Pasquini et al.
8,868,235 B2 *   10/2014   Zhao ...................... B25J 13/088
                                                           700/253

(Continued)

FOREIGN PATENT DOCUMENTS

| CN | 102529711 A | 7/2012 |
| CN | 103974843 A | 8/2014 |

(Continued)

OTHER PUBLICATIONS

Notice of Reasons for Refusal issued in counterpart Japanese Patent Application No. JP 2023-550339, dated Dec. 3, 2024.
(Continued)

*Primary Examiner* — Hau V Phan
(74) *Attorney, Agent, or Firm* — Westbridge IP LLC (57) ABSTRACT

Disclosed is a battery replacement vehicle without intermediate transmission shaft, including: a frame, a front axle assembly provided at a front end of the frame and used for driving front wheels of the vehicle; a drive synthesis device including a drive synthesis box integrated with at least two power sources and an axle package assembly for driving rear wheels of the vehicle; and a quick-change battery detachably provided at a bottom of the frame and located between the front axle assembly and the drive synthesis device. In the present disclosure, the power source is moved backwards (Continued)

and infinitely close to the axle in the rear end of the frame, the transmission shaft used for connecting the electric drive assembly and the axle is canceled.

9 Claims, 8 Drawing Sheets

(58) Field of Classification Search
USPC .......................................................... 180/65.1
See application file for complete search history.

(56) References Cited

U.S. PATENT DOCUMENTS

| | | | | |
|---|---|---|---|---|
| 10,076,971 | B2* | 9/2018 | Huang | H02P 4/00 |
| 10,144,307 | B2* | 12/2018 | Newman | H01M 10/613 |
| 10,173,512 | B1* | 1/2019 | Huang | B60L 50/66 |
| 2011/0000721 | A1 | 1/2011 | Hassett et al. | |
| 2013/0226345 | A1* | 8/2013 | Zhao | B25J 13/088 |
| | | | | 700/258 |
| 2016/0001748 | A1* | 1/2016 | Moskowitz | B60L 58/26 |
| | | | | 701/22 |
| 2018/0251102 | A1* | 9/2018 | Han | H01M 50/578 |

FOREIGN PATENT DOCUMENTS

| | | | |
|---|---|---|---|
| CN | 105966219 | A | 9/2016 |
| CN | 105966221 | A | 9/2016 |
| CN | 106541818 | A | 3/2017 |
| CN | 207416523 | U | 5/2018 |
| CN | 209320658 | U | 8/2019 |
| CN | 209798628 | U | 12/2019 |
| EP | 3597464 | A1 | 1/2020 |
| GB | 2565848 | A | 2/2019 |
| JP | 2008306813 | A | 12/2008 |
| JP | 2017088096 | A | 5/2017 |
| JP | 2018103765 | A | 7/2018 |
| JP | 2019516609 | A | 6/2019 |
| KR | 102066511 | B1 | 1/2020 |

OTHER PUBLICATIONS

Office Action issued in counterpart Russian Patent Application No. 2023114004/11, dated Dec. 28, 2023.
Extended European Search Report issued in counterpart European Patent Application No. 20965716.2, dated Aug. 21, 2024.
Decision on Grant of Patent Invention issued in counterpart Russian Patent Application No. 2023114004, dated Mar. 26, 2024.
Notice of Reasons for Refusal issued in counterpart Japanese Patent Application No. 2023-550339, dated May 7, 2024.
First Office Action issued in counterpart Chinese Patent Application No. 202011471820.0, dated Oct. 18, 2021.
International Search Report and Written Opinion issued in corresponding PCT Application No. PCT/CN2020/139057, dated Sep. 13, 2021.
Refusal Decision issued in counterpart Chinese Patent Application No. 202011471820.0, dated Jun. 22, 2022.
Second Office Action issued in counterpart Chinese Patent Application No. 202011471820.0, dated Mar. 9, 2022.
Decision to Grant a Patent issued in counterpart Japanese Patent Application No. JP 2023-550339, dated Apr. 15, 2025.

* cited by examiner

BATTERY REPLACEMENT VEHICLE WITHOUT INTERMEDIATE TRANSMISSION SHAFT

CROSS-REFERENCE TO RELATED APPLICATIONS

This application is a continuation application of International Application No. PCT/CN2020/139057, filed on Dec. 24, 2020, which claims priority to Chinese Patent Application No. 202011471820.0, filed on Dec. 15, 2020. The disclosures of the above-mentioned applications are incorporated herein by reference in their entireties.

TECHNICAL FIELD

The present disclosure relates to the technical field of vehicles, in particular to a battery replacement vehicle without an intermediate transmission shaft.

BACKGROUND

As the energy crisis and environmental pollution problems increases, countries around the world, especially China, which is a major automobile country, are vigorously advocating and focusing on the development of electric vehicles, and the electric drive system of electric vehicles has become the key point of research and development of various companies. However, in the application field of large-tonnage vehicles, since the vehicle requires a large output torque and ensures a high maximum speed at the same time, most companies use a single high-torque, low-speed drive motor with a fixed speed reduction gear, which leads to problems such as heavyweight of the electric drive system, high manufacturing cost, and insufficient power performance at medium and high-speed; some companies use multi-gear automated mechanical transmission (AMT) to replace the reduction device. In this way, although the power performance of the vehicle at medium and high-speed is improved, the power interruptions caused by frequent gear shifts will still be caused, which will reduce comfort and further increase the system cost. In addition, once the motor fails, the vehicle cannot drive normally.

At present, there are two main technical solutions for the power system of pure electric vehicles: one is that the electric drive assembly is connected to the axle through the drive shaft. The electric drive assembly, the drive shaft and the axle are independent of each other and are connected through the standard pieces when assembling the whole vehicle. The electric drive assembly includes the motor and the electric control, which can be divided into integral type and split type. The second solution is that the electric drives the axle, integrating the electric motor and the axle together. When assembling the whole vehicle, the whole assembly is directly assembled. According to the different needs of the whole vehicle, the electric drive axle products can be integrated with electronic control, reduction device, and transmission. The quantity of electric motors is one or two. If the main reducer is canceled, the two motors are connected to the wheel respectively to form a wheel-side motor or a hub motor.

However, among the above two schemes, the first solution has a transmission shaft, which makes little changes to the axle and the motor itself, but increases the weight of the transmission shaft and reduces the transmission efficiency. In the second solution, the electric drive axle is highly integrated, saving vehicle space, but the mass of the assembly is large, which increases the unsprung mass and affects the noise vibration harshness (NVH).

In addition, in order to increase the pure electric mileage of heavy trucks or transport vehicles for long-distance transportation, the method of hoisting the battery and adding auxiliary small batteries or other additional batteries at the bottom is usually adopted. Although this method can increase the effective mileage of the transport vehicle, it will cause that a variety of battery replacement methods are combined on a vehicle, which increases the complexity of the battery replacement technology of the battery replacement station, which leads to an increasing weight of the vehicle, the high price of the battery replacement station and the battery replacement vehicle.

SUMMARY

The main objective of the present disclosure is to provide a battery replacement vehicle without an intermediate transmission shaft.

One objective of the present disclosure is to solve the technical problem that if the present battery replacement heavy truck or vehicle adopts a battery replacement method similar to the GEELY new energy or the NIO vehicle: replacing the battery from the bottom of the vehicle, i.e. the bottom-vertical-lifting quick battery replacement method, there will be not enough space for arranging the quick replacing battery and the battery capacity is small, thus affecting the driving range of the battery replacement heavy truck or vehicle.

A further objective of the present disclosure is to improve the driving range of the present battery replacement heavy truck or vehicle, various battery replacement method is combined in a vehicle, then the technology and method of the battery replacement station is complicated, resulting in that the vehicle weight is increased, the price of the battery replacement station and vehicle is expensive, and the battery replacement is time consuming, which cannot reflect the advantages of the quick replacing technology of the battery replacement station.

Another objective of the present disclosure is to solve the technical problem that the unsprung mass of the present vehicle is large.

A further objective of the present disclosure is to solve the technical problem that the transmission shaft used for connecting the electric drive assembly and the axle is of large weight, which results in a low power transmitting efficiency.

A further objective of the present disclosure is to provide a drive synthesis box with multi-motors flexible torque. The driving motor with multiple groups of small torques and a high rotational speed is provided in the drive synthesis box with multi-motors flexible torque. In this way, not only the large torque requirement under a low speed working condition can be met and the power performance of the vehicle at a medium or high speed can be ensured, but also the manufacturing cost can be reduced and the reliability of the electric driving system can be improved.

A further objective of the present disclosure is to reduce power interruption and shift stumbling as much as possible by adopting a two-gear transmission to improve the driving comfort.

Specifically, the present disclosure provides a battery replacement vehicle without an intermediate transmission shaft, including:
　a frame;
　a front axle assembly provided at a front end of the frame and used for driving front wheels of the vehicle;

a drive synthesis device comprising a drive synthesis box integrated with at least two power sources and an axle package assembly for driving rear wheels of the vehicle; and a quick-change battery detachably provided at a bottom of the frame and located between the front axle assembly and the drive synthesis device, the quick change battery is used for providing electric power to the power source and allowing quick replacement in a battery replacement station.

In an embodiment, the axle package assembly comprises a middle axle and a rear axle.

In an embodiment, the drive synthesis box is firmly attached to a front side of the middle axle and fixed on the frame of the vehicle.

In an embodiment, the drive synthesis box is fixed on the frame between the middle axle and the rear axle.

In an embodiment, the drive synthesis box is fixed on the frame at a rear side of the rear axle.

In an embodiment, the vehicle is a heavy truck or a light truck.

In an embodiment, the drive synthesis box comprises a reduction gear assembly connected to the driving motor; and the axle package assembly further comprises a main reducer and a differential.

In an embodiment, the drive synthesis box and the axle package assembly are connected through a flange.

In an embodiment, an output end of the reduction gear assembly is directly connected to the main reducer.

In an embodiment, the drive synthesis box further includes a transmission, an input end of the transmission is connected with the output end of the reduction gear assembly, and an output end of the transmission is directly connected to the main reducer.

In an embodiment, output ends of the differential are respectively connected to left and right drive shafts of the vehicle, for transmitting a power output from the power source to wheel ends to drive the wheels of the vehicle.

In an embodiment, the left and right drive shafts include universal joints and are telescopic.

In an embodiment, a quantity of the reduction gear assembly is at least two, and the at least two reduction gear assemblies are connected to the at least two power sources in a one-to-one correspondence.

In an embodiment, each power source includes a drive motor and a motor shaft connected to the drive motor;

each reduction gear assembly includes a first transmission gear connected to the motor shaft, and a second transmission gear engaged with the first transmission gear, the second transmission gear is provided as the output end of the reduction gear assembly;

one of the second transmission gears is shared by the at least two reduction gear assemblies; and the at least two power resources are provided along a circumferential direction of the second transmission gear.

In an embodiment, the transmission includes an input shaft assembly, a middle shaft assembly, an output shaft assembly and a gearshift device;

the input shaft assembly includes an input shaft connected to the second transmission gear and a third transmission gear connected to the input shaft;

the middle shaft assembly includes a middle shaft, a fourth transmission gear and a fifth transmission gear connected to two ends of the middle shaft respectively, the fourth transmission gear is engaged with the third transmission gear;

the output shaft assembly includes an output shaft connected to an input end of the differential and a sixth transmission gear rotatably installed on the output shaft, and the sixth transmission gear is engaged with the fifth transmission gear;

the gearshift device is provided on the output shaft, and is configured to control the output shaft to be connected to the sixth transmission gear or the input shaft;

when the transmission operates in a first gear, the gearshift device is configured to control the output shaft to be connected to the sixth transmission gear to output the drive power transmitted by the reduction gear assembly to the differential through the input shaft, the third transmission gear, the fourth transmission gear, the middle shaft, the fifth transmission gear, the sixth transmission gear and the output shaft successively;

when the transmission operates in a second gear, the gearshift device is configured to control the output shaft to be connected to the input shaft to directly output the drive power transmitted by the reduction gear assembly to the differential to realize a two-gear driving of the vehicle.

Particularly, the present disclosure further provides an electric vehicle, including the drive synthesis device.

In an embodiment, the electric vehicle includes a pure electric heavy truck, a range-extended heavy truck, and a battery replacement heavy truck.

In an embodiment, the battery replacement heavy truck includes a battery replacement box quickly replaced by the battery replacement station.

According to the technical solution of the present disclosure, the power source of the present battery heavy truck or vehicle is moved from the bottom of a cockpit to infinitely close to the axle in the rear end of the frame. By changing the position of the power source, integrating, and canceling the transmission shaft used for connecting the electric drive assembly and the axle, not only the power transmission link is reduced, the power transmission efficiency is improved, but also the battery layout space of the vehicle is increased, the battery capacity of the battery replacement heavy truck is improved, and the range is greatly increased. By substituting the existing hoisting battery replacement and other auxiliary battery replacement methods used in battery replacement heavy trucks with a unified bottom battery replacement method, reduces the technical difficulty of the battery replacement at the battery replacement station, unifies the battery replacement method and greatly improves the battery replacement efficiency of the battery replacement station.

In an embodiment, the drive synthesis device reduces the unsprung mass and improves the NVH performance by fixing the drive synthesis box and the axle package assembly together on the frame of the vehicle.

In an embodiment, the drive synthesis box adopts at least two power sources each including a drive motor, and transmits the drive power output by the power source to the main reducer and then to the differential through the reduction gear assemblies corresponding to the power sources, then the drive power is transmitted to the vehicle axle through the differential to drive the wheels to rotate. The solution of the present disclosure adopts a plurality of low-torque, high-speed drive motors to replace the existing single high-torque, low-speed drive motor, which can meet the large torque requirements in the low-speed working conditions and at the same time ensure high-speed power performance, and reduce manufacturing and procurement costs. In addition, when a certain drive motor fails, the vehicle can still be driven normally with the help of other drive motors, which improves the reliability of the electric drive system.

In an embodiment, the battery replacement vehicle of the present disclosure adopts the two-gear transmission, which can reduce power interruption and shift stumbling as much as possible, improve driving comfort, and reduce the cost when compared to the existing multi-gear AMT transmission.

In an embodiment, according to the working condition of the vehicle, the multiple power sources can work synergistically or independently, which can ensure that the drive motor works in the high-efficiency range while ensuring the vehicle power performance, reduce the power loss of the drive motor, and improve the efficiency of the electric drive system. In addition, by reasonably arranging each drive motor to work in a time-sharing manner, the effect of evenly sharing the accumulated damage of each drive motor is achieved, and the failure rate of the drive motor is reduced.

In an embodiment, by combining an appropriate quantity of dual-motor controllers and single-motor controllers according to the quantity of the drive motors, the manufacturing cost of the motor controllers is reduced.

The above descriptions are only an overview of the technical solutions of the present disclosure, in order to understand the technical solutions of the present disclosure more clearly, it can be implemented according to the contents of the description, and in order to make the above and other objects, features and advantages of the present disclosure more obvious and easier to understand, the following specific embodiments of the present disclosure are given.

The above and other objects, advantages and features of the present disclosure will be more apparent to those skilled in the art from the following detailed description of the specific embodiments of the present disclosure in conjunction with the accompanying drawings.

BRIEF DESCRIPTION OF THE DRAWINGS

Hereinafter, some specific embodiments of the present disclosure will be described in detail by way of illustration and not limitation with reference to the accompanying drawings. The same reference numerals in the drawings designate the same or similar parts or parts. Those skilled in the art will appreciate that the drawings are not necessarily drawn to scale.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by those skilled in the art based on the embodiments of the present disclosure without creative efforts shall fall within the scope of the present disclosure.

First Embodiment

Figure 1:
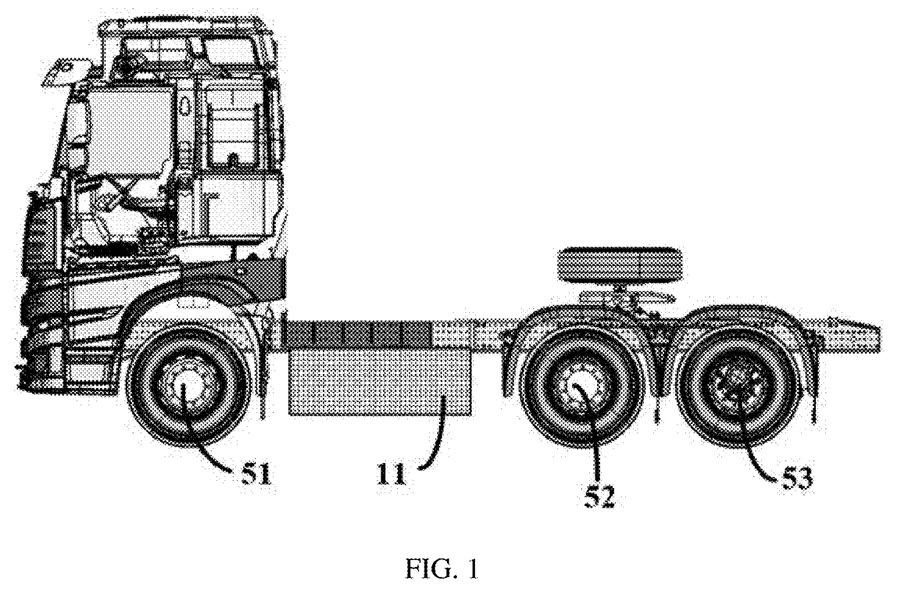
FIG. 1 is a schematic structural block diagram of a battery replacement vehicle according to a first embodiment of the present disclosure.

As shown in FIG. 1, the present disclosure provides a battery replacement vehicle without an intermediate transmission shaft, including a frame, a front axle assembly, a drive synthesis device and a quick-change battery 11. The front axle assembly is provided at a front end of the frame and used for driving front wheels of the vehicle. The drive synthesis device includes a drive synthesis box integrated with at least two power sources and an axle package assembly for driving rear wheels of the vehicle. The quick-change battery 11 is detachably provided at a bottom of the frame and located between the front axle assembly and the drive synthesis device, and is used for providing electric power to the power source and allowing quickly replacement in a battery replacement station. The battery replacement vehicle can be for example, a heavy truck or a light truck.

Figure 2:
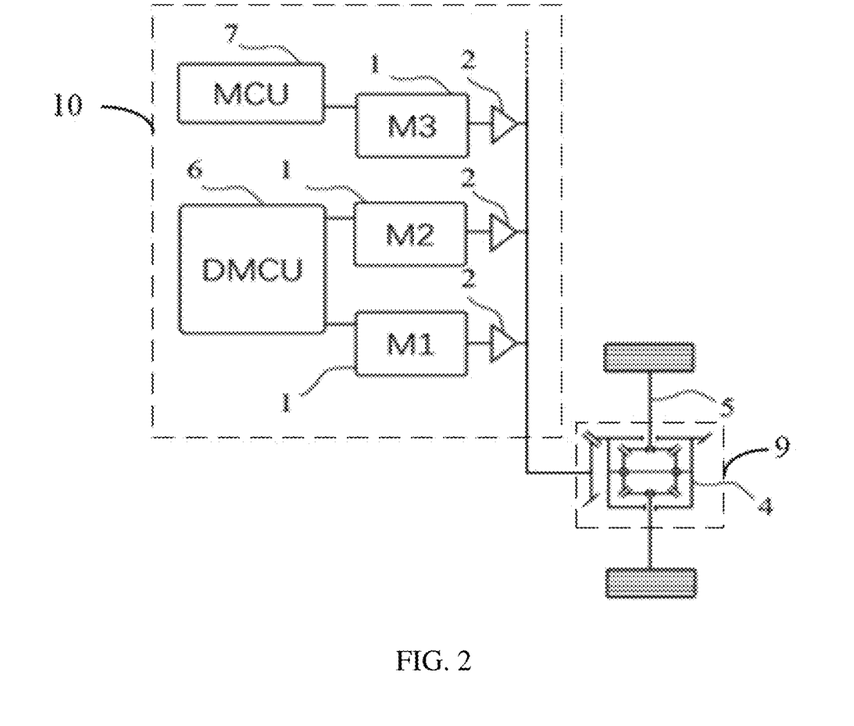
FIG. 2 is a schematic structural block diagram of a drive synthesis box according to the first embodiment of the present disclosure.
Figure 3:
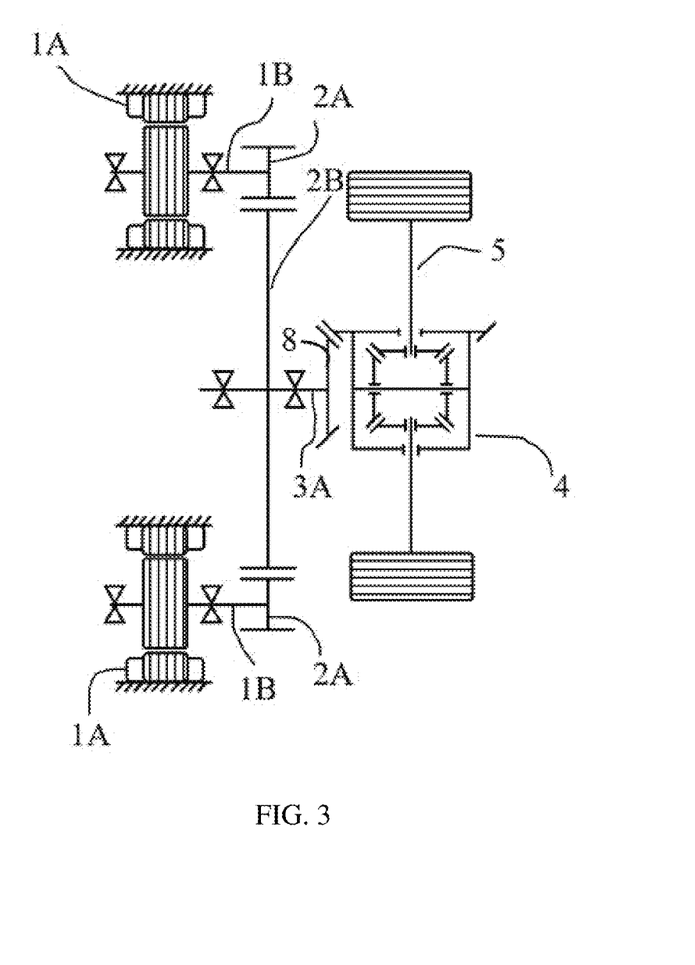
FIG. 3 is a schematic structural view of a drive synthesis box according to the first embodiment of the present disclosure.
Figure 4:
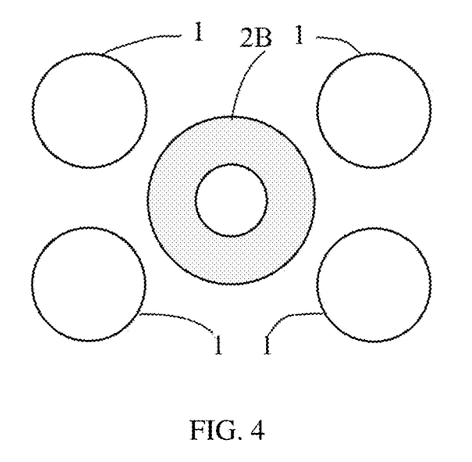
FIG. 4 is a schematic layout diagram of a drive motor according to the first embodiment of the present disclosure.

The front axle assembly includes a front axle 51 located at the front end of the frame. The axle package assembly includes a middle axle 52 located at the middle of the frame and a rear axle 53 located at the rear end of the frame. The drive synthesis box is firmly attached to the front side of the middle axle 52 and fixed on the frame of the vehicle. As shown in FIG. 2 to FIG. 4, the drive synthesis device includes a drive synthesis box 10 and an axle package assembly 9. The drive synthesis box at least includes a power source 1 and a reduction gear assembly 2. The axle package assembly is composed of the main reducer 8 and the differential 4. The drive synthesis box 10 and the axle package assembly 9 are fixed together on the frame of the vehicle. By fixing the driving synthesis box 10 and the axle package assembly 9 together on the frame of the vehicle, the driving synthesis device of the embodiment of the present disclosure reduces the unsprung mass and improves the NVH performance compared with the existing technical solution that the middle axle 52 is fixed on the axle of the vehicle.

The drive synthesis box 10 and the axle package assembly 9 are taken as a whole, and are fixed on the frame through elements such as suspension.

The drive synthesis box of this embodiment may include at least a power source 1 and a reduction gear assembly 2. In one embodiment, the drive synthesis box may further include a differential 4.

The quantity of power sources 1 is at least two, and each power source 1 includes a driving motor 1A for outputting drive power. The performance and geometric dimensions of each driving motor 1A are the same to simplify the control of driving motor 1A. It should be noted that the quantity of power sources 1 shown in FIG. 2 to FIG. 4 is only schematic and can be selected according to vehicle application requirements in practical applications, for example, it can be two, three or even more. In a specific embodiment, the quantity of power sources 1 may be four. The reduction gear assembly 2 has the same quantity as the power source 1, and is connected with the power source 1 in one-by-one correspondence for transmitting the drive power, that is, each power source 1 is connected with a reduction gear assembly 2 correspondingly. The input end of the main reducer 8 is connected to the output end of each reduction gear assembly 2, the output end of the main reducer 8 is connected to the input end of the differential 4, and the output end of the differential 4 is connected to the vehicle axle 5, used for transmitting drive power to the vehicle axle 5 to drive the wheels of the vehicle. The vehicle axle 5 may include a left half shaft and a right half shaft as drive shafts, that is, left and right drive shafts are connected to a wheel respectively. In this embodiment, the vehicle axle 5 is the middle axle 52 of the vehicle. The left and right drive shafts include universal joints, and the left and right drive shafts are configured to be telescopic. Since the existing axle 52 package assembly is provided on the vehicle axle, the axle package assembly moves as the wheels move, but in the embodiment of the present disclosure, the axle package assembly is provided on the frame, and the when the wheels is moving, the axle package is fixed. If the left and right drive shafts are not telescopic and there is no universal joint, the axle package assembly is easy to fail so that the NVH performance of the vehicle is poor.

By canceling the transmission shaft for connecting the electric drive assembly and the axle, the power transmission link is reduced and the power transmission efficiency is improved. And by replacing the existing single high-torque, low-speed drive motor with multiple sets of low-torque, high-speed drive motors 1A, it can meet the high-torque requirements of low-speed working conditions while ensuring medium and high speed power performance, and reduce manufacturing and procurement costs. In addition, when a certain drive motor 1A fails, the vehicle can still be driven normally by other drive motors 1A, which improves the reliability of the electric drive system. Besides, in this embodiment, there is no need to provide a transmission, which simplifies the control of the drive synthesis box, and is especially suitable for vehicles with low-speed use requirements, and can achieve the highest possible economic efficiency under the premise of meeting the vehicle requirements.

As shown in FIG. 3, each power source 1 includes a driving motor 1A and a motor shaft 1B connected to the driving motor 1A. Each reduction gear assembly 2 includes a first transmission gear 2A connected to the motor shaft 1B, and a second transmission gear 2B engaged with the first transmission gear 2A, and the second transmission gear 2B serves as the output end of the reduction gear assembly 2. The driving motor 1A is connected to the first transmission gear 2A through the motor shaft 1B, and then connected to the differential 4 through the second transmission gear 2B, and the driving power output by the driving motor 1A is transmitted to the differential 4 by the engaging of the first transmission gear 2A with the second transmission gear 2B.

Specifically, the at least two reduction gear assemblies 2 may share a second transmission gear 2B, that is, each reduction gear assembly 2 includes its own first transmission gear 2A and a common second transmission gear 2B, which can reduce the quantity of components and reduce the volume of the drive synthesis box, thereby saving the layout space of the drive synthesis box.

Further, in the case that the reduction gear assembly 2 shares the second transmission gear 2B, the at least two power sources 1 can be provided along the circumferential direction of the second transmission gear 2B. For example, as shown in FIG. 4, a plurality of power sources 1 are provided along the circumferential direction with the second transmission gear 2B as the axis center. This arrangement can make the structure of the drive synthesis box more compact, thus further save the layout space of the drive synthesis box.

Specifically, according to the requirements of the vehicle's working conditions, the at least two power sources 1 can work synergistically or independently, while satisfying the vehicle's power performance, it can ensure that the drive motor 1A works in the high-efficiency zone, reduce the power loss of the drive motor 1A, and improve the electric drive system efficiency. Moreover, by rationally providing the work of each driving motor 1A in time-sharing, the effect of sharing the accumulated damage of each driving motor 1A can be achieved, and the failure rate of the driving motor 1A can be lowered.

Specifically, the at least two power sources 1 are provided forward, which means that all the drive motors 1A are provided in front of the reduction gear assembly 2. The forward arrangement can simplify the structure and the assembly operation of the power source 1 and the reduction gear assembly 2. Of course, the power source 1 can also be provided in other ways, such as backward arrangement, opposite arrangement and so on.

In addition, as shown in FIG. 2, the drive synthesis box of this embodiment can also include at least one dual-motor controller (represented by DMCU in FIG. 2) 6, or at least one dual-motor controller 6 and a single-motor controller (represented by MCU in FIG. 2) 7. The quantity of dual-motor controllers 6 and single-motor controllers 7 is determined according to the quantity of drive motors 1A. The dual-motor controller 6 can control the two motors respectively through strategies. In practical applications, dual-motor controllers 6 should be used as much as possible. For example, if the quantity of driving motors 1A is even, all the controllers are dual-motor controllers 6, and the quantity of dual-motor controllers 6 is half of the quantity of driving motors 1A. If the quantity of driving motors 1A is odd, except from the dual-motor controllers 6, a single-motor controller 7 can be used in combination. By using an appropriate quantity of dual-motor controllers 6 and single-motor controllers 7 in combination according to the quantity of driving motors 1A, the manufacturing cost of the motor controller is reduced.

Second Embodiment

Figure 5:
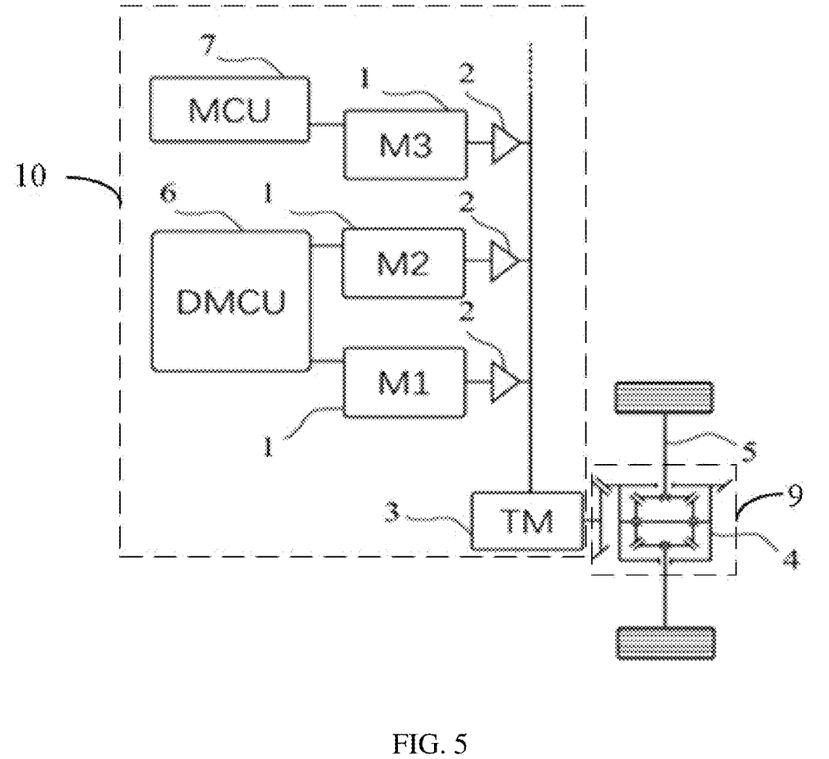
FIG. 5 is a schematic structural block diagram of a drive synthesis box according to a second embodiment of the present disclosure.
Figure 6:
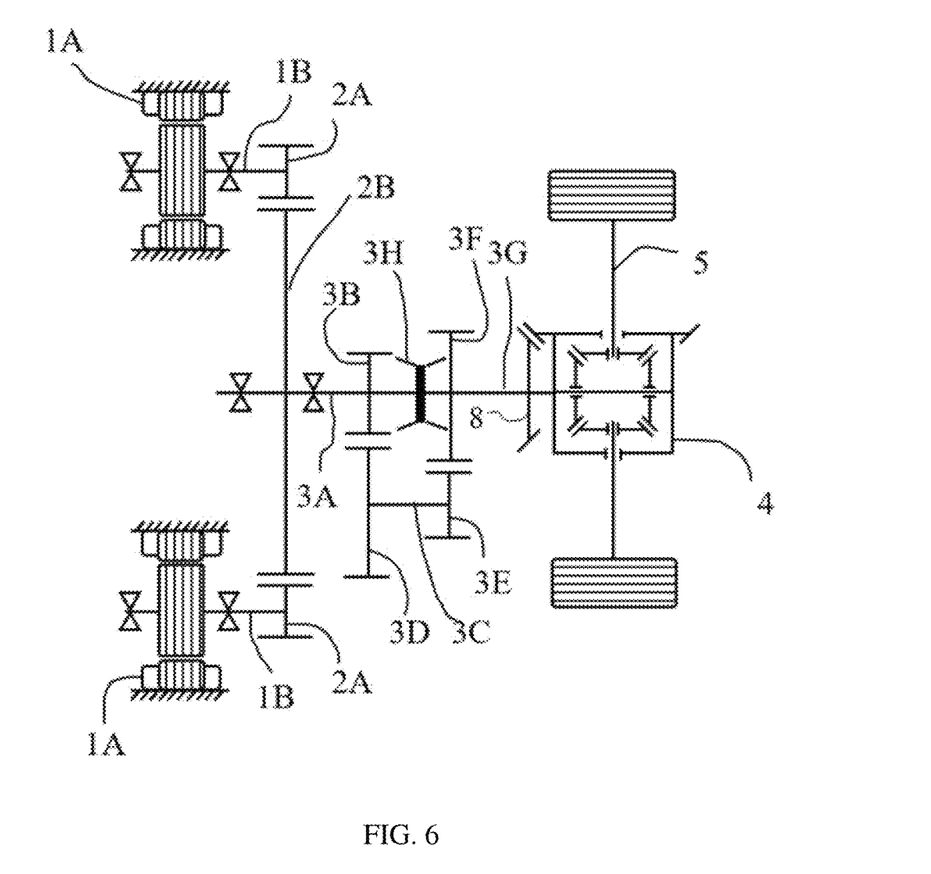
FIG. 6 is a schematic structural view of a drive synthesis box according to the second embodiment of the present disclosure.

As shown FIG. 5 and FIG. 6, the difference between the second embodiment and the first embodiment is that the drive synthesis box of this embodiment further includes a transmission 3 connected between the input end of the main reducer 8 and the output end of each reduction gear assembly 2. Then the output end of each reduction gear assembly 2 (i.e. the second transmission gear 2B) is connected to the transmission 3, and further connected to the input end of the main reducer 8 through the transmission 3.

Specifically, the drive motor 1A, the reduction gear assembly 2, and the transmission 3 of this embodiment are all built with the inner casing of the transmission 3 as a carrier, thereby improving the integration of components and making the structure of the drive synthesis box more compact.

The transmission 3 includes an input shaft assembly, a middle shaft assembly, an output shaft assembly, and a gearshift device 3H. The input shaft assembly includes an input shaft 3A connected to the second transmission gear 2B and a third transmission gear 3B connected to the input shaft 3A. The input shaft 3A and the third transmission gear 3B can be integrally formed, or connected to each other through splines. The middle shaft assembly includes a middle shaft 3C, and a fourth transmission gear 3D and a fifth transmission gear 3E respectively connected to both ends of the middle shaft 3C, and the fourth transmission gear 3D is engaged with the third transmission gear 3B. The fourth transmission gear 3D and the fifth transmission gear 3E are respectively connected to the middle shaft 3C through splines or interference press fitting. The output shaft assembly includes an output shaft 3G connected to the input end of the differential 4 and a sixth transmission gear 3F rotatably installed on the output shaft 3G, and the sixth transmission gear 3F is engaged with the fifth transmission gear 3E. The sixth transmission gear 3F is installed on the output shaft 3G through a needle bearing, and can rotate in the circumferential direction of the output shaft 3G. The gearshift device 3H is provided on the output shaft 3G, and is configured to control the output shaft 3G to be connected with the sixth transmission gear 3F or the input shaft 3A. Specifically, the gearshift device 3H can be installed on the output shaft 3G through a spline interference fit. The gearshift device 3H can generally adopt a synchronizer.

Based on the above structure, the transmission 3 can realize two gears: the first gear and the second gear. When the transmission 3 works in the first gear, the gearshift device 3H controls the output shaft 3G to be connected with the sixth transmission gear 3F to output the drive power transmitted by the reduction gear assembly 2 to the differential 4 through the input shaft 3A, the third transmission gear 3B, the fourth transmission gear 3D, the middle shaft 3C, the fifth transmission gear 3E, the sixth transmission gear 3F and the output shaft 3G successively. When in the second gear, the gearshift device 3H controls the output shaft 3G to be connected to the input shaft 3A to directly output the drive power transmitted by the reduction gear assembly 2 to the differential 4 to realize the two-gear driving of the vehicle.

The drive synthesis box of this embodiment adopts a two-gear transmission, which can reduce power interruption and shift frustration as much as possible, improve driving comfort, and at the same time, compared with the existing multi-gear AMT transmission, reduces the cost.

The working mode of the drive synthesis box will be described in detail below based on the setting of four power sources 1 and the transmission 3 adopting two-gear transmission.

During the actual running of the vehicle, eight different working modes driven by electricity will occur if four power sources 1 cooperate with the two-gear transmission 3 for operation. The relationship between each working mode, the gear of the transmission 3 and the power source 1 is shown in the table below.

| Working mode | Quantity of the drive motor | Gear of the transmission |
| --- | --- | --- |
| EV1 | 1 | 1 |
| EV2 | 1 | 2 |
| EV3 | 2 | 1 |
| EV4 | 2 | 2 |
| EV5 | 3 | 1 |
| EV6 | 3 | 2 |
| EV7 | 4 | 1 |
| EV8 | 4 | 2 |

When only one drive motor 1A is working and the transmission 3 is in the first gear state, the working mode is defined as the first gear mode EV1 driven by electricity. The working mode EV1 is suitable for operating under conditions such as a no-load condition, flat roads, downhill roads with a little slope, or cruising at a low speed. In this working mode, power consumption can be saved. In addition, since the vehicle is driven by a single driving motor and other motors do not operate, the mechanical fatigue and damage can be reduced.

When only one drive motor 1A is working and the transmission 3 is in the second gear state, the working mode is defined as the second gear mode EV2 driven by electricity. The working mode EV2 is suitable for operating under conditions such as a no-load condition, flat roads, or cruising at a high speed.

When two driving motors 1A are working and the transmission 3 is in the first gear state, the working mode is defined as the third gear mode EV3 driven by electricity. The working mode EV3 is suitable for operating under conditions such as a no-load condition, starting on flat roads, or driving with light loads and low speeds.

When there are two drive motors 1A working and the transmission 3 is in the second gear state, the working mode is defined as the fourth gear mode EV4 driven by electricity. The working mode EV3 is suitable for operating under conditions such as a no-load or a light-load condition, flat roads, or cruising at a high speed.

When three drive motors 1A are working and the transmission 3 is in the first gear state, the working mode is defined as the fifth gear mode EV5 driven by electricity. The working mode EV5 is suitable for operating under conditions such as a medium-load or a standard-load condition, starting, flat roads, or driving with a low speed.

When three drive motors 1A are working and the transmission 3 is in the second gear state, the working mode is defined as the sixth gear mode EV6 driven by electricity. The working mode EV6 is suitable for operating under conditions such as a medium-load or a standard-load condition, flat roads, or driving with a low speed.

When the four driving motors 1A work simultaneously and the transmission 3 is in the first gear state, the working mode is defined as the seventh gear mode EV7 driven by electricity. The working mode EV7 is suitable for operating under conditions such as a full-load or an overload condition. Or the working mode EV7 is suitable for the vehicle with a low speed and a large torque to drive on uphill roads with a big slope or start. Under a full-load or an overload condition, the seventh gear mode EV7 can meet requirements of the vehicle with a large torque driving on uphill roads or starting.

When the four driving motors 1A work simultaneously and the transmission 3 is in the first gear state, the working mode is defined as the eighth gear mode EV8 driven by electricity. The working mode EV8 is suitable for operating under conditions such as a full-load or an overload condition, starting on flat roads, driving on uphill roads with a little slope, or cruising at a high speed.

In this embodiment, according to the requirements of the vehicle's working conditions, multiple groups of driving motors can work together or independently, and cooperate with different gears of the transmission. While satisfying the vehicle's power performance, it can ensure that the driving motors work in the high-efficiency zone, reducing the drive power loss of the driving motors, and increasing the efficiency of electric drive systems.

Third Embodiment

Figure 7:
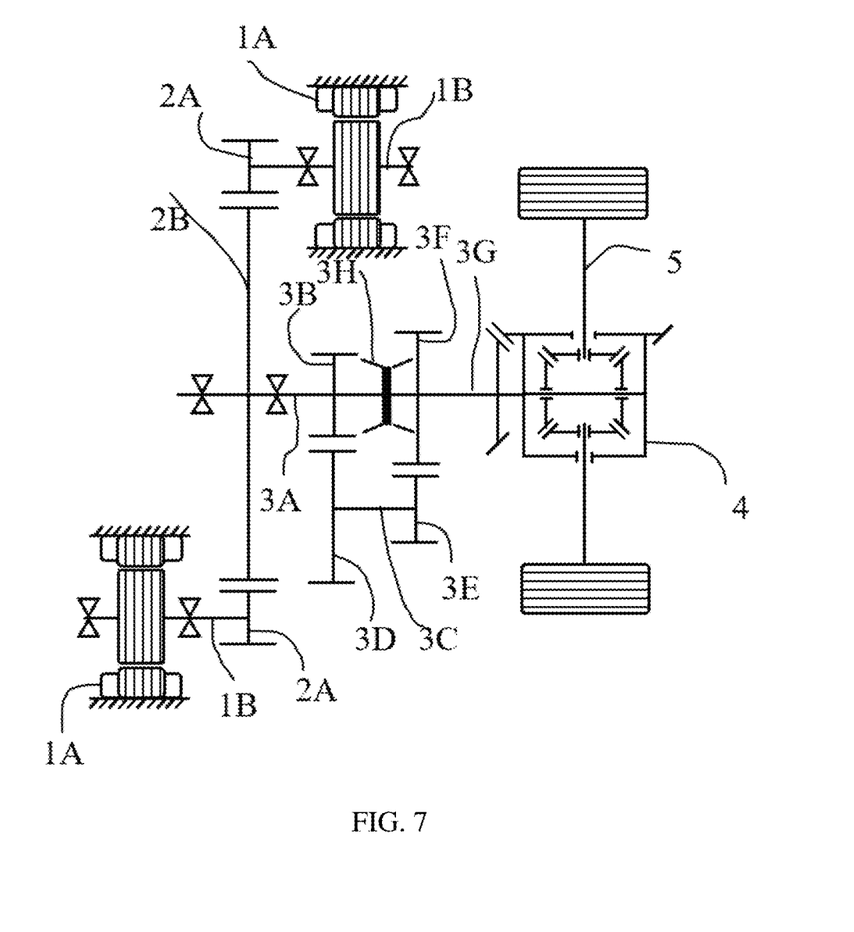
FIG. 7 is a schematic structural view of a drive synthesis box according to a third embodiment of the present disclosure.

Referring to FIG. 7, the difference between the third embodiment and the second embodiment is that multiple power sources 1 are provided in opposite directions. The opposite arrangement means that a part of the driving motor 1A is provided in front of the reduction gear assembly 2 and another part of the driving motor 1A is provided in the rear of the reduction gear assembly 2. For example, for the two power sources 1, one drive motor 1A is provided in front of the reduction gear assembly 2 and the other drive motor 1A is provided in the rear of the reduction gear assembly 2, which is conducive to providing other components or systems of the vehicle in front of the reduction gear assembly to meet the layout of the whole vehicle system.

Fourth Embodiment

Figure 8:
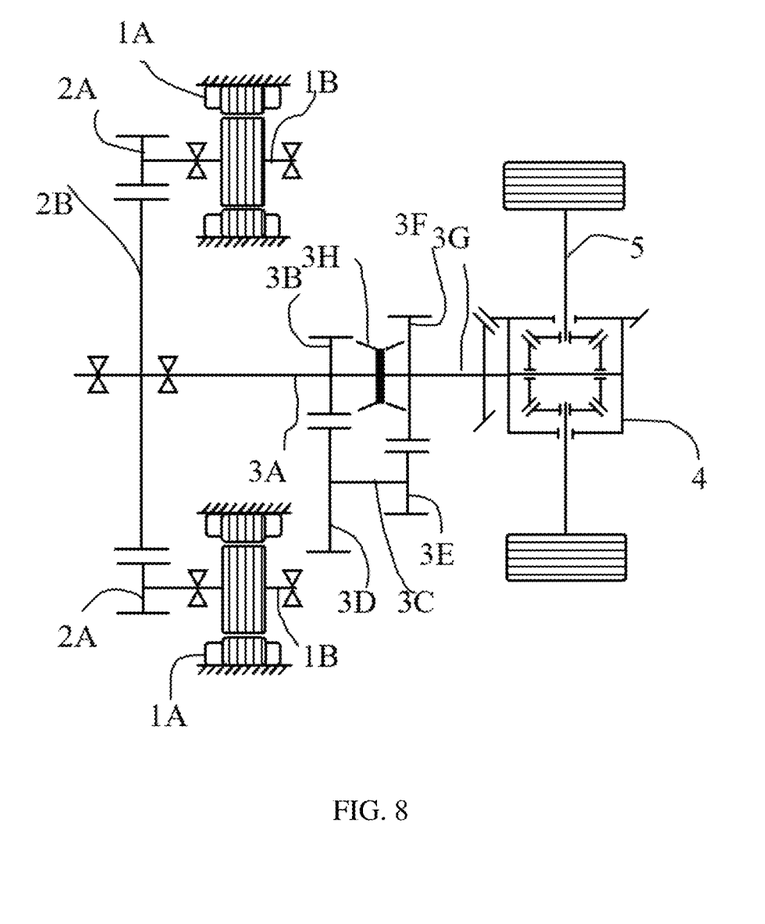
FIG. 8 is a schematic structural view of a drive synthesis box according to a fourth embodiment of the present disclosure.

As shown in FIG. 8, the difference between the fourth embodiment and the second embodiment is that the plurality of power sources 1 are provided rearwards. The rearward arrangement means that all the drive motors 1A are provided behind the reduction gear assembly 2. This arrangement can save space in the axial length, and is conducive to leaving space for installing other components or systems in the axial direction of the vehicle to meet the system layout of the vehicle.

Fifth Embodiment

The difference between the fifth embodiment and the first embodiment is that the drive synthesis box 10 taken as a whole is connected with the axle package assembly 9 taken as another whole through flanges, and both of them are fixed on the frame through suspension and other components.

Sixth Embodiment

The drive synthesis device includes a drive synthesis box 10 and an axle package assembly 9. The drive synthesis box 10 includes at least a power source 1 and a reduction gear assembly 2. The axle package assembly 9 is composed of the main reducer 8 and the differential 4. The drive synthesis box 10 and the axle package assembly 9 are fixed together on the frame of the vehicle, and the drive synthesis box 10 is a drive synthesis box in the prior art, which will not be repeatedly described here.

Seventh Embodiment

The difference between the seventh embodiment and the first embodiment, or the difference between the seventh embodiment and the second embodiment is that the drive synthesis box is fixed on the frame between the middle axle 52 and the rear axle 53.

Eighth Embodiment

The difference between the eighth embodiment and the first embodiment, or between the eighth embodiment and the second embodiment, is that the drive synthesis box is fixed on the frame at the rear side of the rear axle 53. In the embodiment, the vehicle axle 5 is the rear axle 53 of the vehicle.

According to any one of the above embodiments or a combination of multiple embodiments, the embodiments of the present disclosure can achieve the following beneficial effects: the drive synthesis device in the embodiment of the present disclosure reduces the unsprung mass and improves the NVH performance by fixing the drive synthesis box and the axle package assembly together on the frame of the vehicle.

In the description provided herein, numerous specific details are set forth. However, it is understood that embodiments of the disclosure may be practiced without these specific details. In some embodiments, well-known methods, structures and techniques have not been shown in detail in order not to obscure the understanding of this description.

It should be noted that: the above embodiments are only used to illustrate the technical solutions of the present disclosure, rather than limit the present disclosure thereto; although the present disclosure has been described in detail with reference to the foregoing embodiments, for those skilled in the art, within the principles and spirit of the present disclosure it is still possible to modify the technical solutions described in the foregoing embodiments, or to perform equivalent replacements for some or all of the technical features; and these modifications or replacements do not make the corresponding technical solutions deviate from scope of the present disclosure.

What is claimed is:
1. A battery replacement vehicle without an intermediate transmission shaft, comprising:
   a frame;
   a front axle assembly provided at a front end of the frame and used for driving front wheels of the vehicle;
   a drive synthesis device comprising a drive synthesis box integrated with at least two power sources and an axle package assembly for driving rear wheels of the vehicle; and
   a quick-change battery detachably provided at a bottom of the frame and located between the front axle assembly and the drive synthesis device,
   wherein the quick change battery is used for providing electric power to the power source and allowing quick replacement in a battery replacement station;
   wherein the drive synthesis box comprises a reduction gear assembly connected to the driving motor; and
   the axle package assembly further comprises a main reducer and a differential;
   wherein output ends of the differential are respectively connected to left and right drive shafts of the vehicle, for transmitting a power output from the power source to wheel ends to drive the wheels of the vehicle;
   wherein the left and right drive shafts comprise universal joints and are telescopic;
   wherein a quantity of the reduction gear assembly is at least two, and the at least two reduction gear assemblies are connected to the at least two power sources in a one-to-one correspondence;
   wherein each power source comprises a drive motor and a motor shaft connected to the drive motor;

each reduction gear assembly comprises a first transmission gear connected to the motor shaft, and a second transmission gear engaged with the first transmission gear, the second transmission gear is provided as the output end of the reduction gear assembly;
one of the second transmission gears is shared by the at least two reduction gear assemblies; and
the at least two power resources are provided along a circumferential direction of the second transmission gear;
wherein the transmission comprises an input shaft assembly, a middle shaft assembly, an output shaft assembly and a gearshift device;
the input shaft assembly comprises an input shaft connected to the second transmission gear and a third transmission gear connected to the input shaft;
the middle shaft assembly comprises a middle shaft, a fourth transmission gear and a fifth transmission gear connected to two ends of the middle shaft respectively, the fourth transmission gear is engaged with the third transmission gear;
the output shaft assembly comprises an output shaft connected to an input end of the differential and a sixth transmission gear rotatably installed on the output shaft, and the sixth transmission gear is engaged with the fifth transmission gear;
the gearshift device is provided on the output shaft, and is configured to control the output shaft to be connected to the sixth transmission gear or the input shaft;
when the transmission operates in a first gear, the gearshift device is configured to control the output shaft to be connected to the sixth transmission gear to output the drive power transmitted by the reduction gear assembly to the differential through the input shaft, the third transmission gear, the fourth transmission gear, the middle shaft, the fifth transmission gear, the sixth transmission gear and the output shaft successively;
when the transmission operates in a second gear, the gearshift device is configured to control the output shaft to be connected to the input shaft to directly output the drive power transmitted by the reduction gear assembly to the differential to realize a two-gear driving of the vehicle.

2. The battery replacement vehicle of claim 1, wherein the axle package assembly comprises a middle axle and a rear axle.

3. The battery replacement vehicle of claim 2, wherein the drive synthesis box is firmly attached to a front side of the middle axle and fixed on the frame of the vehicle.

4. The battery replacement vehicle of claim 2, wherein the drive synthesis box is fixed on the frame between the middle axle and the rear axle.

5. The battery replacement vehicle of claim 2, wherein the drive synthesis box is fixed on the frame at a rear side of the rear axle.

6. The battery replacement vehicle of claim 1, wherein the vehicle is a heavy truck or a light truck.

7. The battery replacement vehicle of claim 1, wherein the drive synthesis box and the axle package assembly are connected through a flange.

8. The battery replacement vehicle of claim 1, wherein an output end of the reduction gear assembly is directly connected to the main reducer.

9. The battery replacement vehicle of claim 1, wherein the drive synthesis box further comprises a transmission, an input end of the transmission is connected with the output end of the reduction gear assembly, and an output end of the transmission is directly connected to the main reducer.

* * * * *